United States Patent
Zhang et al.

(10) Patent No.: US 10,234,714 B2
(45) Date of Patent: Mar. 19, 2019

(54) LIQUID CRYSTAL MODULE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Long Zhang, Beijing (CN); Mookeun Shin, Beijing (CN); Zhizhong Tu, Beijing (CN); Yongjun Yoon, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 14/897,220

(22) PCT Filed: Mar. 16, 2015

(86) PCT No.: PCT/CN2015/074266
§ 371 (c)(1),
(2) Date: Dec. 9, 2015

(87) PCT Pub. No.: WO2016/082376
PCT Pub. Date: Jun. 2, 2016

(65) Prior Publication Data
US 2016/0291399 A1 Oct. 6, 2016

(30) Foreign Application Priority Data
Nov. 25, 2014 (CN) .......................... 2014 1 0692191

(51) Int. Cl.
*G02F 1/1333* (2006.01)
*G02F 1/1335* (2006.01)
(Continued)

(52) U.S. Cl.
CPC .. *G02F 1/133512* (2013.01); *G02F 1/133308* (2013.01); *G02F 2001/13332* (2013.01);
(Continued)

(58) Field of Classification Search
CPC ... G02F 1/133308; G02F 2001/133322; G02F 2001/133317; G02F 2001/13332; G02F 1/133512
See application file for complete search history.

(56) References Cited

U.S. PATENT DOCUMENTS 5,271,983 A * 12/1993 Ise .......................... D04B 21/02
206/389
5,479,285 A 12/1995 Burke
(Continued)

FOREIGN PATENT DOCUMENTS

CN 1392440 A 1/2003
CN 1804693 A 7/2006
(Continued)

OTHER PUBLICATIONS

Office Action in Chinese Patent Application No. 201410692191.2, dated Sep. 2, 2016.
(Continued)

*Primary Examiner* — Jessica M Merlin
(74) *Attorney, Agent, or Firm* — Brooks Kushman P.C.

(57) ABSTRACT

The present disclosure provides a liquid crystal module and a display device. The liquid crystal module includes a backlight module, a display panel and a support element surrounding the display panel and the backlight module. A light-shielding belt is arranged between a side edge portion of the display panel and the adjacent support element, a first side surface of the light-shielding belt is adhered onto the support element, and an elastic element in abutment against
(Continued)

the display panel is arranged at a second side surface of the light-shielding belt opposite to the first side surface.

14 Claims, 2 Drawing Sheets

(52) U.S. Cl.
CPC ............ *G02F 2001/133317* (2013.01); *G02F 2202/22* (2013.01); *G02F 2202/28* (2013.01)

(56) References Cited

U.S. PATENT DOCUMENTS

| | | | | |
|---|---|---|---|---|
| 2002/0191131 | A1* | 12/2002 | Ota | G02F 1/133512 349/110 |
| 2005/0212991 | A1 | 9/2005 | Sugawara | |
| 2006/0152471 | A1 | 7/2006 | Sugawara | |
| 2010/0073595 | A1* | 3/2010 | Zhang | G02F 1/133308 349/59 |
| 2011/0170017 | A1* | 7/2011 | Liu | G02F 1/133308 348/739 |
| 2013/0077015 | A1* | 3/2013 | Wang | G02F 1/133308 349/58 |
| 2013/0242226 | A1* | 9/2013 | Jeong | G06F 1/1637 349/58 |
| 2014/0218656 | A1* | 8/2014 | Maruno | G02F 1/133608 349/60 |

FOREIGN PATENT DOCUMENTS

| | | |
|---|---|---|
| CN | 101923239 A | 12/2010 |
| CN | 102608779 A | 7/2012 |
| CN | 102778769 A | 11/2012 |
| CN | 102914909 A | 2/2013 |
| CN | 103998979 A | 8/2014 |
| CN | 203811944 U | 9/2014 |
| CN | 104360522 A | 2/2015 |
| CN | 204188918 U | 3/2015 |
| JP | 2009-244499 A | 10/2009 |

OTHER PUBLICATIONS

International Search Report and Written Opinion in PCT International Application No. PCT/CN2015/074266, dated Aug. 14, 2015.

Second Office Action for Chinese Application No. 201410692191.2, dated May 4, 2017, 8 Pages.

Third Office Action for Chinese Application No. 201410692191.2, dated Oct. 18, 2017, 7 Pages.

Extended European Search Report for European Application No. 15801309.4, dated Jun. 7, 2018, 9 Pages.

* cited by examiner

LIQUID CRYSTAL MODULE AND DISPLAY DEVICE

CROSS-REFERENCE TO RELATED APPLICATION

This application is the U.S. national phase of PCT Application No. PCT/CN2015/074266 filed on Mar. 16, 2015, which claims a priority of the Chinese Patent Application No. 201410692191.2 filed on Nov. 25, 2014, the disclosures of which are incorporated in their entirety by reference herein.

TECHNICAL FIELD

The present disclosure relates to the field of liquid crystal display technology, in particular to a liquid crystal module and a display device.

BACKGROUND

Usually, a light-emitting diode (LED) is used by an existing thin film transistor liquid crystal display (TFT-LCD) as a backlight source. Along with a decrease in a thickness of a liquid crystal module, an edge-type backlight module has been used by the TFT-LCD.

In the liquid crystal display device with the edge-type backlight module, usually a display panel is adhered onto a front frame through a double-sided adhesive, and foam is filled within a gap between the display panel and the front frame, so as to prevent the occurrence of light leakage at a periphery of the display panel. However, on one hand, the property of the double-sided adhesive may be degraded due to the heat generated by the LED for a long period of time, and on the other hand, the double-sided adhesive and the foam may usually be displaced due to the deformation of the front frame. Hence, the gap between the display panel and the front frame increases, thereby the more serious light leakage may occur.

Hence, for the existing liquid crystal module, there is an urgent need to improve the light leakage at the periphery of the display panel.

SUMMARY

An object of the present disclosure is to provide a liquid crystal module and a display device, so as to prevent the occurrence of light leakage at a periphery of a display panel, and to reduce the risk of the light leakage even when a front frame is displaced slightly.

In one aspect, the present disclosure provides in one embodiment a liquid crystal module including a backlight module, a display panel and a support element surrounding the display panel and the backlight module. A light-shielding belt is arranged between a side edge portion of the display panel and the adjacent support element, a first side surface of the light-shielding belt is adhered onto the support element, and an elastic element in abutment against the display panel is arranged at a second side surface of the light-shielding belt opposite to the first side surface.

Alternatively, the support element includes a front frame, the front frame includes a first portion parallel to the display panel and directly opposite to the side edge portion of the display panel, and the light-shielding belt is arranged between the first portion and the side edge portion of the display panel.

Alternatively, the light-shielding belt includes a first belt portion which is parallel to the display panel, and a second belt portion which is perpendicular to the first belt portion and surrounding a side edge of the display panel, the first side surface opposite to the first portion is adhered onto the first portion, and the elastic element is arranged at the second side surface opposite to the display panel.

Alternatively, the light-shielding belt further includes a third belt portion parallel to the first belt portion and arranged at a side surface of the display panel other than a side surface opposite to the front frame.

Alternatively, the first belt portion, the second belt portion and the third belt portion are formed integrally.

Alternatively, the support element further includes a bezel, and the second belt portion and the third belt portion are arranged between the display panel and the bezel.

Alternatively, the second belt portion and the third belt portion are adhered onto the display panel.

Alternatively, the light-shielding belt is provided with a gap in which a flexible printed circuit board is arranged.

Alternatively, the light-shielding belt is made of antistatic fabrics.

Alternatively, the elastic element is made of flexible plastics.

Alternatively, the light-shielding belt is provided with a via-hole into which the elastic element is secured.

Alternatively, the via-hole is provided in the first belt portion of the light-shielding belt.

Alternatively, the elastic element is of a hollow, horn-like shape.

Alternatively, a diameter of each of two end portions of the elastic element is greater than that of a middle portion.

In another aspect, the present disclosure provides in one embodiment a display device including the above-mentioned liquid crystal module.

According to the liquid crystal module and the display device in the embodiments of the present disclosure, the light-shielding belt is arranged at the side edge portion of the display panel, so as to prevent the light leakage at the periphery of the display panel. In addition, the elastic element in abutment against the display panel is arranged on the light-shielding belt, and when the support element is displaced slightly from the display panel, it is able to prevent the light-shielding belt from being displaced greatly due to the elastic deformation of the elastic element, thereby to reduce the risk of the light leakage.

DETAILED DESCRIPTION

The present disclosure will be described hereinafter in conjunction with the drawings and embodiments. Obviously, the following embodiments are merely a part of, rather than all of, the embodiments of the present disclosure, and based on these embodiments, a person skilled in the art may, without any creative effort, the other embodiments, which also fall within the scope of the present disclosure.

The present disclosure provides in one embodiment a liquid crystal module, which includes a backlight module, a display panel and a support element surrounding the display panel and the backlight module. A light-shielding belt is arranged between a side edge portion of the display panel and the adjacent support element, a first side surface of the light-shielding belt is adhered onto the support element, and an elastic element in abutment against the display panel is arranged at a second side surface of the light-shielding belt opposite to the first side surface.

According to the liquid crystal module in the embodiment of the present disclosure, the light-shielding belt is arranged at the side edge portion of the display panel, so as to prevent the light leakage at the periphery of the display panel. In addition, the elastic element in abutment against the display panel is arranged on the light-shielding belt, and when the support element is displaced slightly from the display panel, it is able to prevent the light-shielding belt from being displaced greatly due to the elastic deformation of the elastic element, thereby to reduce the risk of the light leakage.

Figure 1:
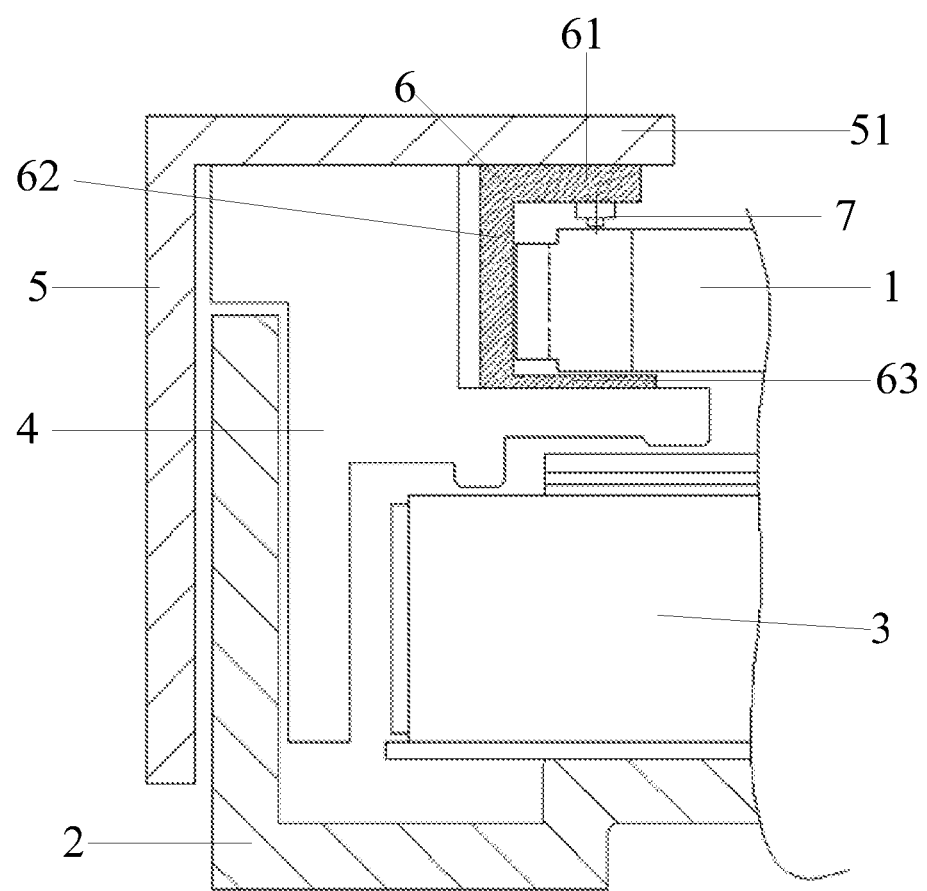
FIG. 1 is a sectional view of a liquid crystal module according to the first embodiment of the present disclosure.

Referring to FIG. 1, which is a schematic view showing the liquid crystal module according to the first embodiment of the present disclosure, the liquid crystal module includes a display panel 1, a backlight module which serves as a light source for the display panel, and a support element surrounding the display panel and the backlight module. To be specific, the backlight module includes a back plate 2, a light-guiding member 3 arranged on the back plate 2, and a light source (not shown) arranged at a side of the light-guiding member 3. The light-guiding member 3 includes a light-guiding plate, a reflector, and so on. The structure of the light-guiding member 3 is known in the art, and thus will not be particularly defined herein. Through such an edge-type backlight module, the light from the light source is converted by the light-guiding member 3 into an area light source for displaying an image at the display panel 1.

In FIG. 1, the display panel 1 is arranged right above, and parallel to, the light-guiding member 3.

The support element includes a bezel 4 surrounding a periphery of each of the display panel 1 and the light-guiding member 3 and configured to assemble the display panel 1 and the light-guiding member 3 together, and a front frame 5 covering the bezel 4 and configured to package the above-mentioned members.

The connection relationship among the bezel 4, the front frame 5, the display panel 1, the light source and the light-guiding member 3 is known in the art and meanwhile it is not a research focus in the present disclosure, and thus will not be particularly defined herein.

It should be appreciated that, in order to secure the display panel 1, a portion of the front frame 5 usually covers a side edge of the display panel 1. In other words, referring to FIG. 1, the front frame 5 includes a first portion 51 parallel to the display panel 1 and directly opposite to the side edge portion of the display panel 1. The first portion 51 is arranged in front of the side edge of the display panel 1, and the bezel 4 is arranged in back of the display panel 1, so as to secure the display panel 1.

Further, the liquid crystal module in this embodiment further includes at least one light-shielding belt 6 arranged between the first portion 51 of the front frame 5 and the display panel 1, so as to prevent the occurrence of light leakage at the periphery of the display panel 1.

To be specific, referring to FIG. 1, the light-shielding belt 6 includes a first belt portion 61, a second belt portion 62 and a third belt portion 63. Alternatively, the first belt portion 61, the second belt portion 62 and the third belt portion 63 are made of an identical material and formed integrally. Of course, they may also be made of different materials separately, and then assembled together.

The first belt portion 61 is arranged parallel to the display panel 1, and a first side surface opposite to the first portion 51 of the front frame 5 is adhered onto the first portion 51, for example, using a double-sided adhesive. An elastic element 7 in abutment against the display panel 1 is arranged at a second side surface opposite to the display panel 1. The first belt portion 61 is arranged in front of the display panel 1, so as to prevent the occurrence of light leakage at the side edge portion of the display panel 1 directly opposite to the front frame 5. Through the elastic element 7 in abutment against the display panel, it is able to displace the display panel 1 slightly during the assembly, and to reduce the risk of the light leakage when the gap increases due to the slight deformation of the front frame during the assembly.

The second belt portion 62 is perpendicular to the first belt portion 61 and surrounds the side edge of the display panel 1. In this embodiment, the second belt portion 62 is arranged between the display panel 1 and the bezel 4, so as to fill the gap therebetween, thereby to prevent the occurrence of light leakage at the gap.

The third belt portion 63 is arranged parallel to the first belt portion 61, at a side surface of the display panel 1 other than a side surface opposite to the front frame 5, and between the display panel 1 and the bezel 4, so as to prevent the occurrence of light leakage at a side of the display panel 1.

Alternatively, the second belt portion 62 and the third belt portion 63 are adhered onto the display panel 1 and the bezel 4, respectively.

In the first embodiment as shown in FIG. 1, no flexible printed circuit board is connected to the side edge portion of the display panel 1, while in the second embodiment, a flexible printed circuit board is connected to the side edge portion of the display 1.

Figure 2:
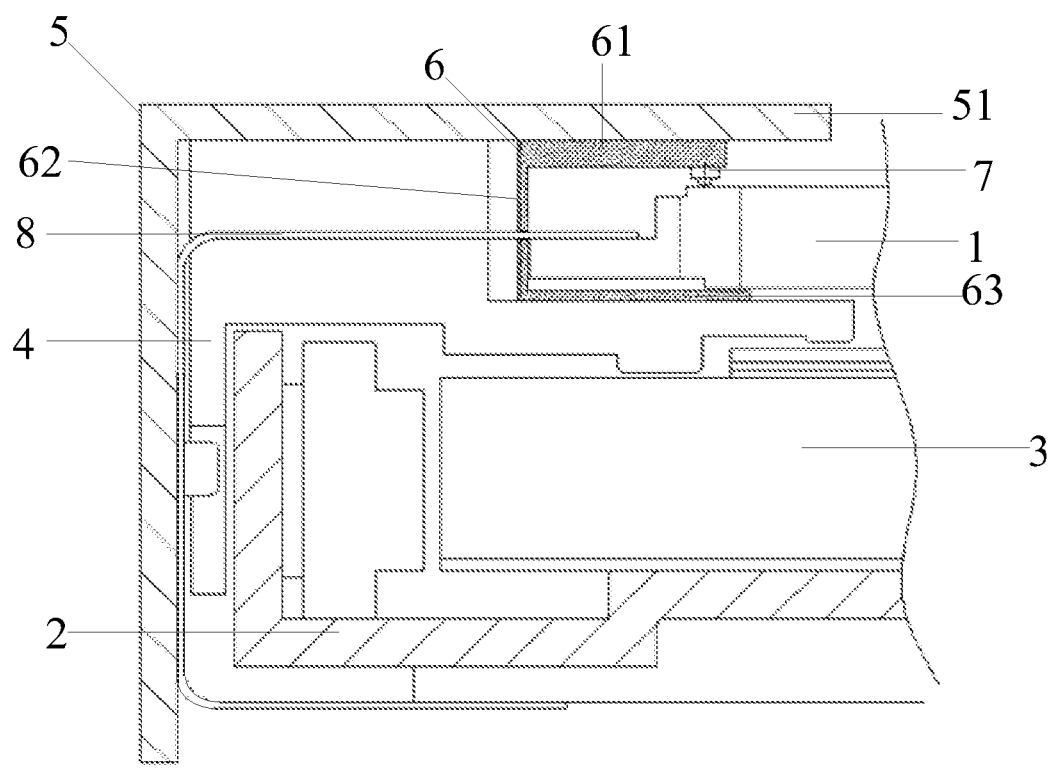
FIG. 2 is another sectional view of the liquid crystal module according to the second embodiment of the present disclosure.

Referring to FIG. 2, identical to the first embodiment, the backlight module includes the back plate 2 and the light-guiding member 3. The support element includes the bezel 4 and the front frame 5, and at least one light-shielding belt 6 is arranged between the first portion 51 of the front frame 5 and the display panel 1 so as to prevent the occurrence of light leakage at the periphery of the display panel 1. To be specific, the light-shielding belt 6 includes the first belt portion 61, the second belt portion 62 and the third belt portion 63. The first side surface of the first belt portion 61 opposite to the first portion 51 of the front frame 5 is adhered onto the first portion 51, and the elastic element 7 is arranged at the second side surface opposite to the display panel 1. The connection relationship among the above members may refer to that mentioned in the first embodiment.

Different from the first embodiment, the second belt portion 62 in this embodiment is provided with a via-hole into which a flexible printed circuit board 8 is inserted. The flexible printed circuit board 8 by-passes the back plate 2, penetrates through the bezel 4 and the second belt portion 62, and is then connected to the side edge portion of the display panel 1, so as to transmit a driving signal to the display panel 1 for displaying an image.

Figure 3:
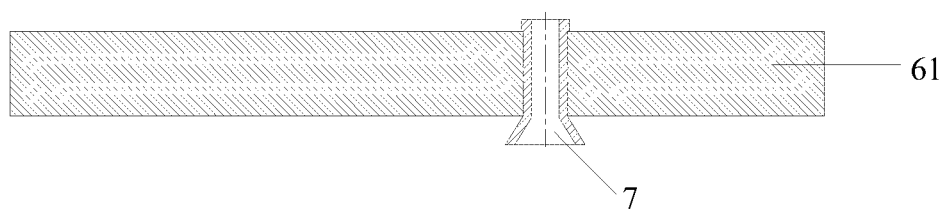
FIG. 3 is a sectional view of a structure consisting of a light-shielding belt and the elastic element according to one embodiment of the present disclosure.

In the liquid crystal module in the first and second embodiments, the light-shielding belt 6 is made of antistatic fabrics, and the elastic element 7 is mad of flexible plastics. Referring to FIG. 3, which is a sectional view of the elastic element 7, the first belt portion 61 is provided with a via-hole. Alternatively, the elastic element 7 is of a hollow, horn-like shape. Two end portions thereof may be each of a diameter greater than a middle portion. Due to the elasticity, the elastic element 7 is inserted through the via-hole in the first belt portion 61, and the diameter of the middle portion is identical to a diameter of the via-hole, i.e., the first belt portion 61 is sleeved onto the middle portion of the elastic element 7. Because the diameters of the two end portions are greater than the diameter of the middle portion, the elastic element 7 cannot separate itself from the first belt portion 61, and instead, it may be secured to the first belt portion 61. The connection mode between the elastic element 7 and the light-shielding belt 6 is not limited to the above, and the other reliable connection modes may also be applied.

According to the liquid crystal module in the above embodiments, the elastic element is arranged on the light-shielding belt, so as to prevent the occurrence of light leakage at the periphery of the display panel, and to reduce the risk of light leakage at the gap between the front frame and the display panel when the front frame is displaced slightly from the display panel during the assembly.

The above description is given by taking the light-shielding belt with the elastic element arranged between the front frame and the display panel as an example. However, the combination of the light-shielding belt and the elastic element may also be applied to any other position in the liquid crystal module where the light leakage is to be prevented.

The present disclosure further provides in one embodiment a display device including the above-mentioned liquid crystal module. The other members of the display device are known in the art, and thus will not be particularly defined herein.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A liquid crystal module, comprising a backlight module, a display panel and a support element surrounding the display panel and the backlight module, wherein
    a light-shielding belt is arranged between a side edge portion of the display panel and the adjacent support element,
    a first side surface of the light-shielding belt is adhered onto the support element, and
    an elastic element in abutment against the display panel is arranged at a second side surface of the light-shielding belt opposite to the first side surface, and the elastic element is arranged between the second side surface of the light-shielding belt and a surface of the display panel facing the second side surface of the light-shielding belt,
    wherein the support element comprises a front frame comprising a first portion parallel to the display panel and directly opposite to the side edge portion of the display panel, and the light-shielding belt is arranged between the first portion and the side edge portion of the display panel,
    the light-shielding belt comprises a first belt portion which is parallel to the display panel, and a second belt portion which is perpendicular to the first belt portion and surrounding a side edge of the display panel, the first side surface opposite to the first portion is adhered onto the first portion, and the elastic element is arranged at the second side surface opposite to the display panel,
    the elastic element is in direct contact with the first belt portion but not in contact with the second belt portion, and is arranged at an end of the first belt portion spaced from the second belt portion, and the first belt portion, the second belt portion and the elastic element form a groove which comprises a gap between the second belt portion and the elastic element, and
    the elastic element is hollow and is of a horn-like shape which has two end portions each of which has a diameter greater than a diameter of a middle portion.

2. The liquid crystal module according to claim 1, wherein the light-shielding belt further comprises a third belt portion parallel to the first belt portion and arranged at a side surface of the display panel other than a side surface opposite to the front frame.

3. The liquid crystal module according to claim 2, wherein the first belt portion, the second belt portion and the third belt portion are formed integrally.

4. The liquid crystal module according to claim 2, wherein the support element further comprises a bezel, and the second belt portion and the third belt portion are arranged between the display panel and the bezel.

5. The liquid crystal module according to claim 2, wherein the second belt portion and the third belt portion are adhered onto the display panel.

6. The liquid crystal module according to claim 1, wherein the light-shielding belt is provided with a gap in which a flexible printed circuit board is arranged.

7. The liquid crystal module according to claim 1, wherein the light-shielding belt is made of antistatic fabrics.

8. The liquid crystal module according to claim 1, wherein the elastic element is made of flexible plastics.

9. The liquid crystal module according to claim 1, wherein the light-shielding belt is provided with a via-hole into which the elastic element is secured.

10. The liquid crystal module according to claim 9, wherein the via-hole is provided in the first belt portion of the light-shielding belt.

11. A display device comprising the liquid crystal module according to claim 1.

12. The display device according to claim 11, wherein the light-shielding belt further comprises a third belt portion parallel to the first belt portion and arranged at a side surface of the display panel other than a side surface opposite to the front frame.

13. The display device according to claim 12, wherein the first belt portion, the second belt portion and the third belt portion are formed integrally.

14. The liquid crystal module according to claim 1, wherein a contact area between the elastic element and the first belt portion is larger than that between the elastic element and the display panel.

* * * * *